(12) United States Patent
Della Toffola (10) Patent No.: US 11,834,639 B2
(45) Date of Patent: Dec. 5, 2023

(54) DEVICE AND METHOD FOR TREATING MUST

(71) Applicant: Della Toffola S.P.A., Signoressa di Trevignano (IT)

(72) Inventor: Giacomo Della Toffola, Montebelluna (IT)

(73) Assignee: DELLA TOFFOLA S.P.A., Signoressa di Trevignano (IT)

( * ) Notice: Subject to any disclaimer, the term of this patent is extended or adjusted under 35 U.S.C. 154(b) by 757 days.

(21) Appl. No.: 16/625,903

(22) PCT Filed: Jun. 20, 2018

(86) PCT No.: PCT/IB2018/054538
§ 371 (c)(1),
(2) Date: Dec. 23, 2019

(87) PCT Pub. No.: WO2018/235010
PCT Pub. Date: Dec. 27, 2018

(65) Prior Publication Data
US 2020/0148982 A1    May 14, 2020

(30) Foreign Application Priority Data

Jun. 23, 2017  (IT) .......... 102017000070472

(51) Int. Cl.
*C12G 1/02*          (2006.01)
*A23N 1/02*          (2006.01)
*C12G 1/00*          (2019.01)

(52) U.S. Cl.
CPC .......... *C12G 1/02* (2013.01); *A23N 1/02* (2013.01); *C12G 1/005* (2013.01)

(58) Field of Classification Search
CPC .. A23N 1/02; A23L 2/04; C12G 1/005; C12G 1/02; B01F 27/50; B01F 27/81; B01F 27/811
See application file for complete search history.

(56) References Cited

U.S. PATENT DOCUMENTS

| | | | | |
|---|---|---|---|---|
| 1,686,953 | A | * | 10/1928 | Brown .................. B02C 18/065 241/282.2 |
| 2,417,184 | A | * | 3/1947 | Wagner ............... B02C 13/2804 241/73 |
| 2,577,095 | A | * | 12/1951 | Walker .................... B01F 27/50 366/136 |

(Continued)

FOREIGN PATENT DOCUMENTS

| WO | WO-2013105016 A2 * | 7/2013 | ......... A22C 17/0026 |
|---|---|---|---|
| WO | 2016072720 A1 | 5/2016 | |

OTHER PUBLICATIONS

PCT International Search Report and Written Opinion dated Aug. 21, 2018 for Intl. App. No. PCT/IB2018/054538, from which the instant application is based, 14 pgs.

(Continued)

*Primary Examiner* — John J Norton
(74) *Attorney, Agent, or Firm* — Fredrikson & Byron, P.A.

(57) ABSTRACT

A device (12) for treating must, comprising a duct (14) for the flow of said must, having an inlet end (16) and an outlet end (18), characterized in that it comprises inside the duct (14) cutting means (20) comprising at least one rotating cutting blade (22) interfering at least partially with the must flow.

16 Claims, 3 Drawing Sheets

(56) References Cited

U.S. PATENT DOCUMENTS

| | | | |
|---|---|---|---|
| 5,918,978 A * | 7/1999 | Schieg | B01F 27/85 |
| | | | 162/243 |
| 2007/0104842 A1 | 5/2007 | Margolis et al. | |
| 2011/0048253 A1* | 3/2011 | Melandri | A01G 17/026 |
| | | | 99/638 |
| 2014/0263767 A1 | 9/2014 | Pellenc et al. | |
| 2015/0079255 A1* | 3/2015 | Mitchell | C12G 1/0216 |
| | | | 137/563 |

OTHER PUBLICATIONS

Sparrow, A.M. et al., "Accentuated Cut Edges (ACE): Effects of Skin Fragmentation on the Composition and Sensory Attributes of Pinot noir Wines," American Journal of Enology and Viticulture, vol. 67, No. 2, Jan. 15, 2016, pp. 169-178.

Sparrow, A.M. et al., "Skin Particle Size Affects the Phenoloic Attributes of Pinot noir Wine: Proof of Concept," American Journal of Enology and Viticulture, vol. 67, No. 1, Nov. 3, 2015, pp. 29-37.

* cited by examiner

DEVICE AND METHOD FOR TREATING MUST

RELATED APPLICATIONS

This application is a 35 U.S.C. 371 national stage filing from International Application No. PCT/IB2018/054538, filed Jun. 20, 2018, which claims priority to Italian Application No. 102017000070472, filed Jun. 23, 2017, the teachings of which are incorporated herein by reference.

The present invention relates to a device and a method for treating must.

In particular, the present invention relates to a device and method for treating the must and grapes obtained from the destemming or destemming/pressing stage or via a pump-over tank.

As is well known, the production of a wine is distinguished essentially by products (wines) which are obtained by means of red wine vinification and those obtained by means of white wine vinification.

In the first case, the bunches of grapes are destemmed and the berries may be crushed with a gentle (or stronger) action so as to obtain a must consisting of a mixture of juice and pulp of the berries containing the skin and the substantially intact seeds. The must then undergoes a more or less long period of maceration in contact with the skins.

In the second case, instead, the grape berries may be loaded directly into a press via a storage/maceration tank.

In the present description, rose wine vinification is understood as being included in white wine vinification without the skins and it is possible in any case to extract the colour prior to pressing with maceration of the skins for up to 48 hours.

It is well known that the conversion of grapes into wine is a complex biochemical process resulting from the fermentation (activated by enzymes and yeasts which are both natural—since present in the fruit—and added), said fermentation converting the sugars from the fruit into alcohol. It therefore consists of a process lasing several days.

The first stage in this process is the destemming/crushing of the grape berries, which industrially is performed in apparatus called destemmers/crushers, where the grapes are initially destemmed and crushed and/or only destemmed, giving a must comprising a liquid phase, part of the fruit pulp, as well as the skins of the berries containing in most cases the seeds, while the grape-stalks of the initial bunches are removed.

Various enzymatic activities are started when the berries are broken: it is in fact well-known that the berries, and in particular the skins, contain components (mainly colouring pigments, anthocyanins and tannins) which influence both the visual or so-called aesthetic (colouring) properties and the organoleptic characteristics of the resultant wine.

For this reason the stage which immediately follows destemming/crushing, generally referred to as maceration, is such that the skins remain in contact with the liquid phase in the must for a more or less long period of time so as to release to the fermentation mixture precisely the desired components.

The fermentation mixture is then subjected to the alcoholic fermentation process, namely a biochemical reaction during which the sugars present, owing to the action of the yeasts, are converted into ethyl alcohol and other precious substances which have an important role as regards the aroma and taste of the wine, thus completing the organoleptic heritage associated with the various grape varieties.

The role of alcoholic fermentation is decisive for the formation of the aromatic and taste characteristics of the wine.

Less useful and/or in some cases undesirable are the components present in the seeds, which advantageously should be discarded.

Some studies, also more recently, relating to red wine vinification, have shown that if the skin is divided up into several parts before fermentation a rapid extraction of the desired substances is favoured.

However, a normal fragmentation action involves the risk of simultaneous fragmentation of the seeds present in the skins and therefore the release of undesirable substances.

In particular two publications, both from the year 2016, have considered this problem and have highlighted the advantages which arise if the skins are broken down into small pieces. In the experiments described, in particular in the second of these two publications, a household-type immersion mixer, surrounded by a steel bell-shaped member, was used as apparatus for fragmenting the skins, said mixer being immersed in the vessel containing the must along with skins. It was in fact noticed that most of the seeds were freed from the surrounding skin and were dispersed intact, without being subject to the cutting action of the blade.

The publications in question are as follows:

"Skin Particle Size Affects the Phenolic Attributes of Pinot noir Wine: Proof of Concept—Angela M. Sparrow, Richard E. Smart, Robert G. Dambergs, and Dugald C. Close", and "Accentuated Cut Edges (ACE): Effects of Skin Fragmentation on the Composition and Sensory Attributes of Pinot noir Wines—Angela M. Sparrow, Helen E. Holt, Wes Pearson, Robert G. Dambergs, and Dugald C. Close".

It can be immediately understood that the direct application of the measure employed in the above experiment is not compatible with the volumes involved in the industrial production of red wine, and in particular with production-line treatment of the must resulting from destemming/crushing, when it must contain the skins of the wine berries during maceration and conversion into wine.

Moreover, in the prior art there is no mention of solutions able to reduce the time needed for maceration/fermentation, while maintaining, if not even improving, the qualities of the final product during white wine vinification.

The object of the present invention is therefore to solve the drawbacks of the prior art in an advantageous manner from an industrial point of view.

A first task of the present invention is to provide a device and a method for treating must obtained from the destemming/crushing stage.

A second task of the present invention is to provide a device which can be implemented industrially and allows fragmentation of the berry skins without cutting the seeds.

A third task of the present invention is to provide a device which can be easily associated with a conventional vinification plant.

Another task of the present invention is to provide a vinification method which allows better and faster extraction from the berry skin of optimum amounts of substances which determine the quality of the wine.

A further task of the present invention is to provide a vinification method which allows the time needed for the maceration and/or fermentation stage to be reduced significantly.

A task of the present invention is also that of providing a vinification method which allows a wine with improved organoleptic properties to be obtained.

Finally, a task of the present invention is to provide a vinification device and method which are able to increase the productivity for the same volume of the vinification tanks.

The object and the tasks are achieved with a vinification device according to claim 1 and a method according to claim 15.

Below "must" will be understood always as meaning a fluid comprising juice and/or skins of crushed grape berries.

According to a first aspect the invention relates to a device for treating the must obtained from the destemming or destemming/crushing stage, comprising a duct adapted for the must flow and having an inlet end and outlet end. The device is characterized in that it comprises, inside the duct, cutting means comprising at least one rotating cutting blade interfering at least partially with the must flow.

Moreover, according to a second aspect the invention relates to a vinification method in which, between destemming/crushing or only destemming of the bunches of grapes and maceration, or pressing of the must containing the skins, resulting from destemming/crushing or only destemming, the must flow is subjected to the action of a device provided with cutting means interfering at least partially with the must flow.

The advantages and characteristic features of the present invention will emerge clearly from the detailed description below of a number of examples of embodiment provided by way of a non-limiting example, with reference to the attached drawings in which.

Figure 1:
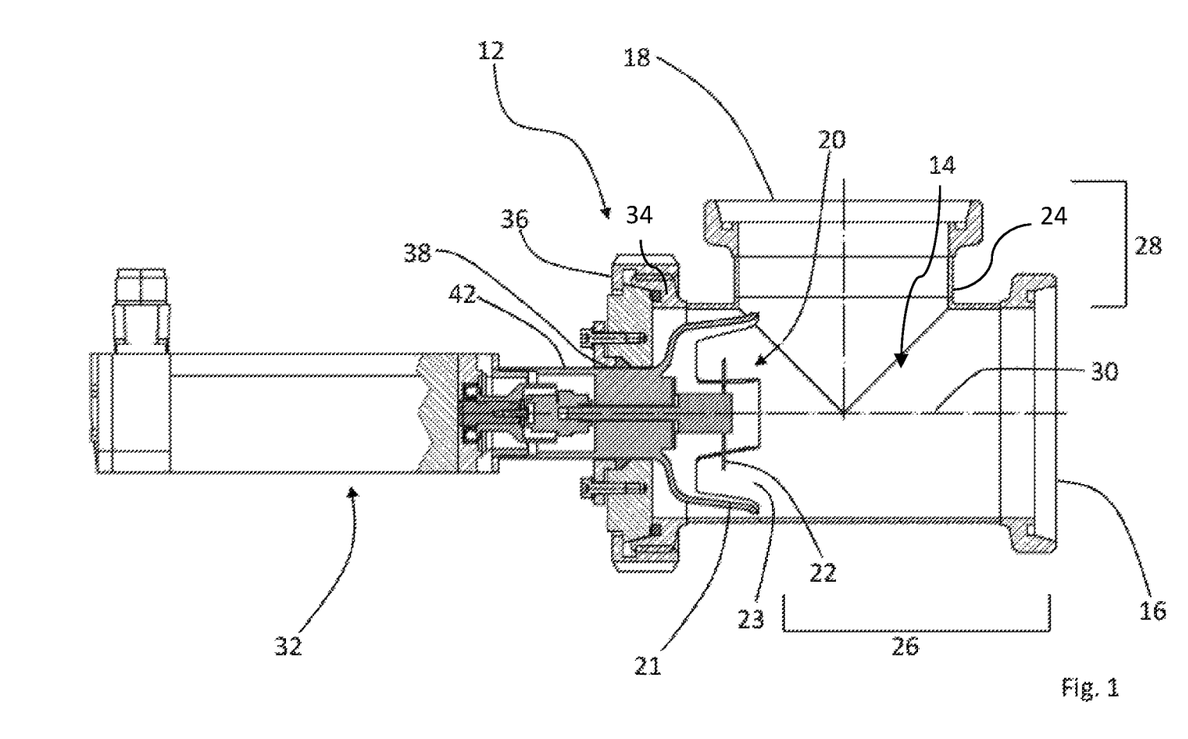
FIG. 1 shows in schematic form a possible embodiment of a device according to the present invention in a first working position.

FIG. 1 shows a device 12 for treating must, comprising a duct 14 for the flow of said must, having an inlet end 16 and an outlet end 18. Cutting means 20, comprising at least one rotating cutting blade 22 interfering at least partially with the must flow, are arranged inside the duct 14.

In accordance with a possible embodiment of the present invention, in the case of red wine vinification, the device 12 may be positioned between a destemming machine or destemmer/crusher and a maceration tank.

Still in the case of red wine vinification, the device 12 may be adapted to be positioned along a pipe used for pumping over ("remontage") in a maceration tank.

"Pumping over" is understood as meaning the step where the must inside the maceration tank is transferred from the bottom of the tank to the top.

In accordance with a further embodiment of the present invention, in the case of white wine vinification, the device 12 may be positioned between a destemming machine or destemmer/crusher and a wine press or a storage/maceration tank.

FIG. 1 shows a device 12 for treating the must obtained from the destemming/crushing stage, comprising a must flow duct 14 having an inlet end 16 and an outlet end 18 and adapted to be positioned for example upstream of a maceration tank (not shown).

The inlet end 16 and the outlet end 18 may comprise fixing flanges.

The device 12 comprises inside the duct 14 cutting means 20 comprising at least one rotating cutting blade 22 interfering at least partially with the fluid flow.

The duct 14 may extend in a substantially rectilinear manner, this embodiment not being shown in the attached figures.

Figure 2:
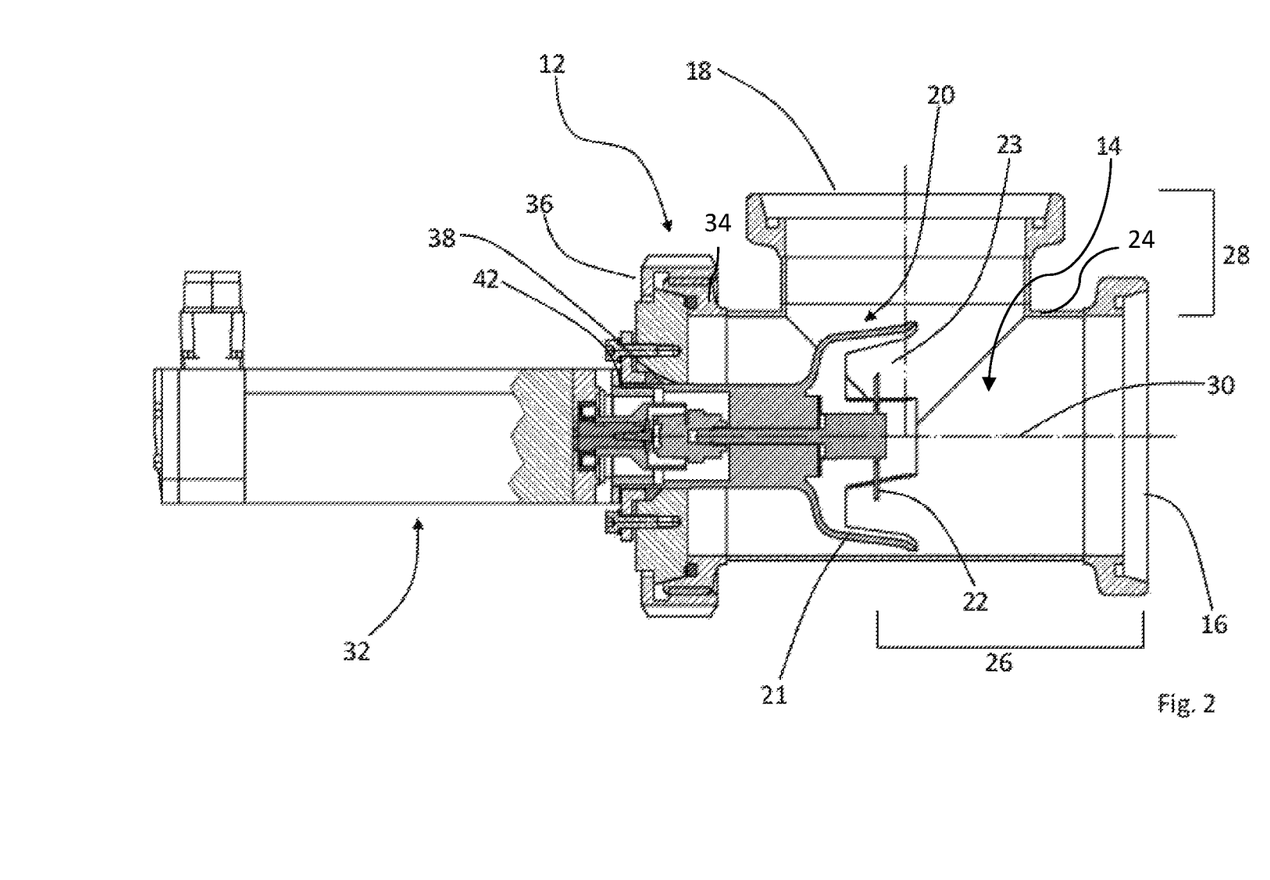
FIG. 2 shows in schematic form a possible embodiment of a device according to the present invention in a second working position.

FIGS. 1 and 2 shows instead the preferred configuration of the present invention in which the duct 14 has an elbow 24. Advantageously the elbow may be a 90° elbow.

In both embodiments, with a straight duct or an elbow duct, the plane in which the rotating blade lies may be substantially horizontal or substantially vertical, namely parallel or at right angles to the axis of the must flow duct.

In the preferred embodiment of the present invention, shown in FIGS. 1 and 2, the elbow 24 is directed so that a first section 26 which comprises the inlet end 16 is substantially horizontal and a second section 28 which comprises the outlet end 18 is substantially vertical. Since it is only a preferred orientation, other orientations are however possible, for example intermediate orientations in which for example the second section is not substantially vertical. As regards the orientation of the rotating cutting blade 22, in accordance with a possible embodiment of the present invention, in the case of a straight duct 14, the axis of rotation 30 of the rotating cutting blade 22 may be substantially parallel to the duct 14. Alternatively, it may be inclined, and advantageously it may be perpendicular to the axis of the duct 14.

In the preferred embodiment shown in FIGS. 1 and 2, the axis of rotation 30 of the rotating cutting blade 22 is substantially parallel to the first section 26.

Advantageously, the cutting means 20 are arranged in the vicinity of the elbow 24.

With reference to FIGS. 1 and 2, the cutting means 20 may be mounted inside a housing arranged along a surface situated opposite the inlet end 16.

Advantageously, the duct 14 may be T-shaped, where the two opposite ends are intended for entry of the fluid flow and for the cutting means, respectively.

The cutting means 20 comprise drive means 32 arranged on the outside of the duct 14.

The drive means 32 may be, for example a motor of the brushless, stepper, synchronous or asynchronous type.

Advantageously, at the end opposite to the inlet end 16, in the region of an operating flange 34, a cover 36 may be provided. The cover 36 is provided with a seat 38 for the cutting means 20. The seat 38 may consist of a hole, which may be shaped.

The cutting means 20 may comprise an arm 42 having one end connected to the drive means 32 and one end on which the at least one rotating cutting blade 22 is mounted.

The arm 42 is provided with means for transferring the rotational movement from the drive means 32 to the rotating cutting blade 22.

In accordance with a possible embodiment of the present invention, the position of the rotating cutting blade 22 inside the duct 14 may be adjusted. Advantageously, the position may be adjusted between a completely retracted position (shown in FIG. 1) and a completely extracted position (shown in FIG. 2).

The arm 42 may be adapted to slide on the seat 38 and be locked also in the intermediate position, by means of the locking systems known per se to the person skilled in the art.

In accordance with a possible embodiment of the present invention, the device 12 may be arranged on a movable support or carriage (not shown in the attached figures) so that it may be easily moved.

Advantageously, the second section 28 may have a second elbow (not shown in the attached figures), sufficiently far from the elbow 24 to prevent an operator from accessing the rotating cutting blade 22.

Figure 3:
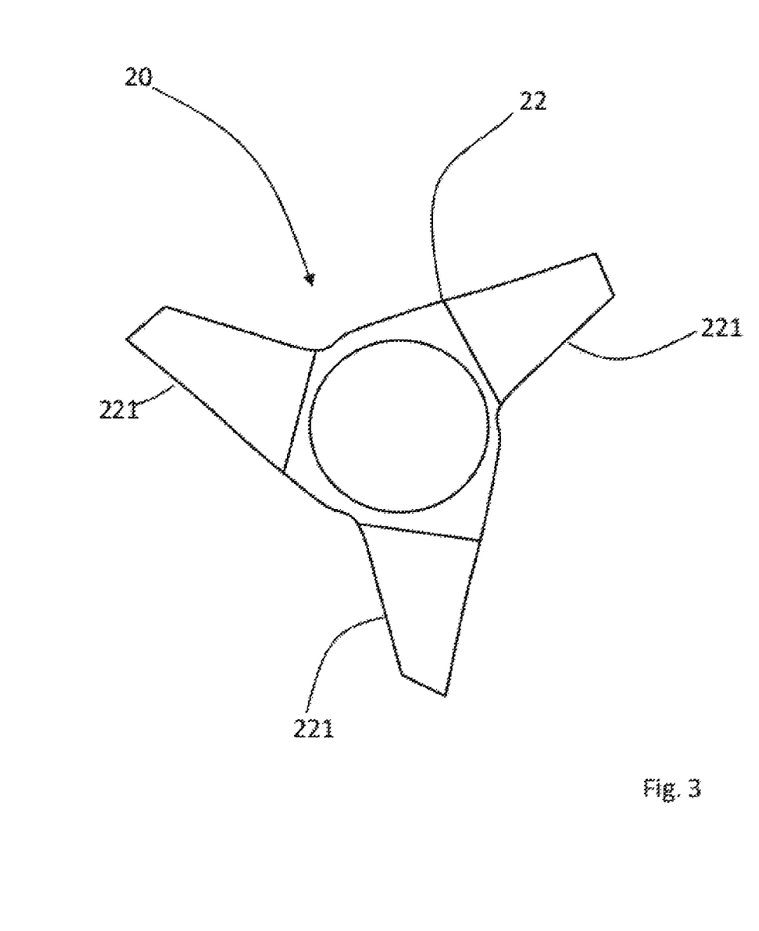
FIG. 3 shows in schematic form a plan view from below of a component of the device according to the present invention.

FIG. 3 shows a possible embodiment of a rotating cutting blade 22, comprising three cutting elements 221. The three cutting elements 221 may be arranged at regular intervals.

In accordance with a possible embodiment of the present invention the cutting elements 221 may comprise a folded section so that they are inclined with respect to a plane perpendicular to their axis of rotation.

The cutting means 20 may comprise a bell-shaped cowl 21 arranged so as to screen the rotating cutting blade 22. The bell-shaped member 21 may comprise one or more openings 23 through which the product processed by the rotating cutting blade 22 can be expelled.

In accordance with a possible embodiment of the present invention, the diameter of the rotating cutting blade 22 may be between 50 and 150 mm.

In accordance with a possible embodiment of the present invention, the diameter of the duct 14 may be between a nominal diameter of 50 mm and a nominal diameter of 200 mm.

In turn, according to the vinification method according to the present invention, essentially between destemming/crushing of the bunches of grapes and maceration of the must containing the skins resulting from destemming/crushing in the case of red wine vinification or pressing in the case of white wine vinification, the must flow is subjected to the action of cutting means 20 designed to interfere with said flow.

In the preferred embodiment of the method according to the present invention, it comprises a stage where the must flow comprising juice and crushed grape berries is made to pass through the device 12 of the present invention inserted between the duct from the destemmer/crusher and a duct intended to supply the maceration tank or a wine press connected to fermentation vats.

In accordance with possible alternative embodiments of the present invention, the device 12 may be provided with volumetric or centrifugal pumps.

As regards the main operating parameters of the device, it has been seen that, in order to adjust processing, it is possible to modify, as indicated above, not only the configuration of the duct 14 and its orientation, but also the flowrate of the duct 14 and the number of rotations of the rotating cutting blade 22.

As regards the flowrate of the duct 14, this may be preferably between 5 and 60 tonnes per hour, and preferably between 8 and 30 tonnes per hour.

The speed of rotation of the rotating cutting blade 22 is much lower than 9000 rpm, preferably between 2500 and 3500 rpm, and even more preferably about 2800 rpm.

Tests for a comparison between conventional red and white wine vinification processes and processes performed using the device and method according to the present invention are described below.

Example 1): Red Wine Vinification

Product Used:
Merlot grape: 4000 kg of grapes obtained from vineyard situated in the district of Oderzo, flat terrain, Sylvoz cultivation system, installation size 1.4×3 metres, production per hectare: 110 quintals.

Cabernet grape: 4000 kg of grapes from vineyard situated in the district of Oderzo, flat terrain, Sylvoz cultivation system, installation size 1.4×3 metres, production per hectare: 100 quintals.

Mechanical grape-harvesting using a Volentieri VG 2000/TA grape harvester, year 1998.

Della Toffola Cingano DRM 18 crusher, year 1999

Selected yeasts

Kreyer refrigerator

Vinification method: the two batches of grapes were divided into two parts weighing 2000 kg each, on which conventional red wine vinification was carried out, i.e.: destemming/crushing, red wine vinification with maceration for four and eight days, pressing. As mentioned, each batch of Merlot and Cabernet grapes was divided into two parts weighing 2000 kg each, one part being processed using the conventional method (referred to as "control method"), while in the second case (referred to as "test method") the device according to the present invention was inserted immediately after the destemming section and before the fermentation tank.

The two parts were subjected to vinification for different time periods: the "control method" part was allowed to macerate for eight days, while the "test method" part was allowed to macerate for four days.

| | Vinification method | | | |
|---|---|---|---|---|
| | Merlot | | Cabernet | |
| | Control method | Test method | Control method | Test method |
| Crushing | Yes | Yes | Yes | Yes |
| Red wine vinification | 8 days | 4 days | 8 days | 4 days |
| Fermentation | 4 days | 4 days | 4 days | 4 days |
| Maturation | 6 months | 6 months | 6 months | 6 months |

It was decided to halve the fermentation maceration time of the Test method compared to the Control method in order to see whether this technology allowed the extraction of the same amount or greater amount of anthocyanins in a shorter time period compared to the Control method.

During vinification, the following were added to all the samples:

Solfosol 40% 20 ml/ql:

Selected yeast 20 g/hl;

$SO_2$: 25 mg/1 for each racking;

Ammonium sulphate and ammonium phosphate (fermentation activator) 25 g/hl;

Analyses conducted

During crushing, samples were taken and analyses conducted in order to identify:

breakage of the skins;

breakage of the grape pips;

general analysis: alcohol; sugar; total acidity; volatile acidity; pH; total $SO_2$; free $SO_2$; total tannins; total pigments; total phenols; pigmented tannins; free anthocyanins.

The fundamental aim of the analyses was to identify the capacity of the system according to the present invention to fragment the skins of the berries without damaging as far as possible the grape pips.

Oenological Aspects

After two weeks of processing the wines had the following characteristics:

| SAMPLE | | Merlot Control method | Merlot Test method | Cabernet Control method | Cabernet Test method |
|---|---|---|---|---|---|
| Alcoholic strength by volume | % VOL | 11.71 | 11.44 | 11.22 | 10.77 |
| Glucose + Fructose | g/l | 0.8 | 0.6 | 0 | 0 |
| Total alcoholic strength by volume | % VOL | 11.76 | 11.48 | 11.22 | 10.77 |
| Total sulphur dioxide | mg/l | 13 | 10 | 9 | 6 |
| Free sulphur dioxide | mg/l | 0 | 3 | 1 | 2 |
| Total acidity (in tartaric acid) | g/l | 6.4 | 6.7 | 7 | 6.3 |
| pH | | 3.51 | 3.53 | 3.63 | 3.75 |
| Tartaric acid | g/l | 2.73 | 3.38 | 2.35 | 2.51 |
| Volatile acidity | g/l | 0.28 | 0.24 | 0.23 | 0.19 |
| Total dry extract | mg/l | 28.7 | 31.5 | 28.1 | 29.7 |
| Non-reducing extract | mg/l | 27.9 | 30.9 | 28.1 | 29.7 |
| L-malic acid | g/l | 1.66 | 1.63 | 2.92 | 2.19 |

After 6 months' maturation an analysis and tasting test was carried out on the wines. Analysis:

| SAMPLE | | Merlot Control method | Merlot Test method | Cabernet Control method | Cabernet Test method |
|---|---|---|---|---|---|
| Alcoholic strength by volume | % VOL | 11.49 | 11.21 | 11.52 | 12.18 |
| Glucose + Fructose | g/l | 0.2 | 0.6 | 0.1 | 1.1 |
| Total alcoholic strength by volume | % VOL | 11.5 | 11.25 | 11.53 | 12.25 |
| Total sulphur dioxide | mg/l | 37 | 63 | 37 | 40 |
| Free sulphur dioxide | mg/l | 8 | 13 | 7 | 12 |
| Total acidity (in tartaric acid) | g/l | 4.6 | 4.7 | 4.3 | 4.4 |
| pH | | 3.67 | 3.67 | 3.86 | 3.92 |
| Volatile acidity | g/l | 0.45 | 0.46 | 0.49 | 0.42 |
| Total polyphenols | mg/l | 948 | 1209 | 736 | 1014 |
| Anthocyanins | mg/l | 151 | 215 | 123 | 222 |

Tasting Test

Appearance: An initial visual inspection clearly revealed a much greater colour intensity in the products obtained by means of the system according to the present invention, even though the maceration time was significantly shorter.

Bouquet:

Merlot: from an olfactory point of view the product processed using the system according the invention has a more intense bouquet than the classic red fruits bouquet obtained with the control method.

Cabernet: in this case also the product processed using the system according to the present invention have a slightly more intense bouquet than the product of the control method.

Taste:

Merlot: several differences between the two products were clearly noted. The wine obtained with the system according to the present invention has a much fuller taste which lasts longer after swallowing.

Cabernet: in this case also the product processed using the system according to the present invention has a slightly fuller and longer lasting taste.

Example 2): White Wine Vinification

Product Used:
Sauvignon Blanc grape: obtained from vineyard in the southern valleys of South Australia.

Vinification Method:
first and second containers with a capacity of 1000 L each were filled with crushed grapes.

The contents of the first container were transferred directly to the wine press and pressed; following pressing, 850 L of juice (identified as "Control SB juice") were produced and stored in cooled stainless-steel fermentation vats.

The contents of the second container were subjected to the action of the device 12 according to the present invention before being transferred to the wine press; in this case also, following pressing, 850 L of juice (identified as "Test SB juice") were produced and stored in cooled stainless-steel fermentation vats.

| SAMPLE | | Control method SB juice | Test method SB juice |
|---|---|---|---|
| ° Bé | | 12.7 | 12.9 |
| pH | | 3.41 | 3.37 |
| Titratable acidity (T.A.) | g/l | 6.40 | 6.66 |
| Total sulphur dioxide | mg/l | 37 | 5 |
| Free sulphur dioxide | mg/l | 5 | 0 |

35 mg/l of potassium metabisulphite were added to the Test SB juice, thus raising the concentration of free $SO_2$ to 15 mg/l.

The following were added to both the juices:
350 mg/l of nutrient based on yeast rind; and
150 mg/l of a solution containing yeast ES 181 (Lallemand Australia Pty Ltd). 6 days after the start of fermentation, 120 mg/l of further enzymatic nutrients were added to each fermentation vat.

Analyses Performed:
breakage of the skins. The degree of fragmentation of the skins contained in the must treated with the device 12 according to the present invention was 2.5 times greater than the control method must which underwent only the action of the destemmer/crusher;

fermentation trend. The daily temperature of the Test SB juice in the fermentation vat was slightly higher than the daily temperature of the Control SB juice in the fermentation vat.

It is considered that the higher temperature of the Test SB juice is due to extraction of sugars and nutrients from skin fragments which are smaller than those of the Control SB juice.

The fermentation of the Test SB juice was considered to have finished after 14 days, while for the Control SB juice 18 days were required.

After the fermentation step, a clarifying agent (bentonite) was added to both juices and the latter were then bottled.

Tasting Test

Appearance: the wine treated using the device according to the present invention has a more marked yellow/green appearance.

Bouquet: the wine treated using the device according to the present invention offers an excellent variety of aromas with a greater and more subtle intensity.

Taste: the wine treated using the device according to the present invention offers more marked fruity plant-like aromas resulting in a more subtle taste of the wine which lingers longer in the mouth.

The advantages obtained with the device and the method according to the present invention are therefore now evident.

With the present invention it is possible to cut the skin without breaking and/or cutting the seeds.

Consequently, the present invention is able to achieve a greater extraction of the colouring and/or aromatic components, resulting in a reduction in the maceration and/or fermentation time, while at the same time obtaining white and red wines with a superior taste component. Moreover, differently from the experiments mentioned further above, it has been possible to provide a method for treating along a production line the must obtained from the destemmer/crusher, which may be implemented without modification of the existing production lines.

Moreover, with the present invention it is possible to reduce greatly the time needed for vinification in a manner able to be implemented on an industrial scale, with a substantial increase in the productivity; in fact, since the vinification time is essentially halved, greater use may be made of the vinification tanks for a new vinification process.

Furthermore, the device according to the present invention may be made with mechanical and electromechanical components which are widely available on the market and low-cost, in particular as regards the electric motors, in view of the low number of rpm (approx. 2800) needed for operation of the rotating blade means.

In the present invention, the device may be used also in combination with thermo-vinification, hot pre-maceration, cold pre-maceration or cryomaceration techniques.

The person skilled in the art, in order to satisfy specific needs, may make modifications to the embodiments described above and/or replace the elements described with equivalent elements, without thereby departing from the scope of the attached claims.

The invention claimed is:

1. A device for treating must in a vinification process, comprising:
   a duct for the flow of said must, the duct having an elbow with a first section comprising an inlet end and with a second section comprising an outlet end;
   wherein the device comprises inside the duct a cutting means comprising at least one rotating cutting blade interfering at least partially with the must flow, the at least one rotating cutting blade being arranged with an axis of rotation of the blade being substantially parallel to the first section; and
   wherein the cutting means comprise a bell-shaped cowl arranged so as to screen the rotating cutting blade.

2. The device according to claim 1, characterized in that said elbow has a 90° elbow.

3. The device according to claim 1, characterized in that the at least one rotating cutting blade is arranged with the axis of rotation being perpendicular to the second section.

4. The device according to claim 1, characterized in that the device comprises an operating flange which is arranged at the opposite end to the inlet end and which has, mounted thereon, a cover provided with a seat for an arm, one end of which is connected to drive means and the other end of which is provided with the at least one rotating cutting blade.

5. The device according to claim 1, characterized in that the rotating cutting blade comprises three cutting elements arranged at regular angular intervals.

6. The device according to claim 1, characterized in that said bell-shaped cowl comprises at least one side opening through which the product processed by the rotating cutting blade may be expelled.

7. A vinification method, for treating must in a vinification process:
   wherein between a stage of either destemming-crushing or destemming of bunches of grapes, and a stage of either maceration or pressing of must containing skins resulting from the stage of either destemming-crushing or destemming, a must flow is subjected to action of a cutting means of a device comprising a duct for the must flow, the duct having an elbow with a first section comprising an inlet end and with a second section comprising an outlet end;
   wherein the device comprises inside the duct the cutting means comprising at least one rotating cutting blade interfering at least partially with the must flow, the at least one rotating cutting blade being arranged with an axis of rotation of the blade being substantially parallel to the first section;
   wherein the vinification is a red wine vinification process, and either the duct of the device is a pipe used for pumping over the must in a maceration tank, or the device is positioned between either a destemmer-crusher or a destemmer and a maceration tank.

8. The method according to claim 7, characterized in that the rotating cutting blade rotates at a speed of less than 9000 rpm.

9. The method according to claim 7, characterized in that the rotating cutting blade rotates at a speed of between 2500 and 3500 rpm.

10. The method according to claim 7, characterized in that the flowrate inside the duct is between 5 and 60 tonnes per hour.

11. The method according to claim 10, characterized in that the flowrate inside the duct is between 8 and 30 tonnes per hour.

12. A vinification method, for treating must in a vinification process:
    wherein between a stage of either destemming-crushing or destemming of bunches of grapes, and a stage of either maceration or pressing of must containing skins resulting from the stage of either destemming-crushing or destemming, a must flow is subjected to action of a cutting means of a device comprising a duct for the must flow, the duct having an elbow with a first section comprising an inlet end and with a second section comprising an outlet end;
    wherein the device comprises inside the duct the cutting means comprising at least one rotating cutting blade interfering at least partially with the must flow, the at least one rotating cutting blade being arranged with an axis of rotation of the blade being substantially parallel to the first section; and
    wherein the vinification is a white wine vinification process, and the device is either positioned between a destemmer-crusher or a destemmer and a wine press, or positioned between a destemmer-crusher or a destemmer and a storage or maceration tank.

13. The method according to claim 12, characterized in that the rotating cutting blade rotates at a speed of less than 9000 rpm.

14. The method according to claim 12, characterized in that the rotating cutting blade rotates at a speed of between 2500 and 3500 rpm.

15. The method according to claim 12, characterized in that the flowrate inside the duct is between 5 and 60 tonnes per hour.

16. The method according to claim 15, characterized in that the flowrate inside the duct is between 8 and 30 tonnes per hour.

* * * * *